(12) United States Patent
Kajiyama (10) Patent No.: US 9,762,808 B2
(45) Date of Patent: Sep. 12, 2017

(54) IMAGING APPARATUS AND CONTROLLING METHOD THEREFORE

(71) Applicant: CANON KABUSHIKI KAISHA, Tokyo (JP)

(72) Inventor: Hiroyuki Kajiyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/801,734

(22) Filed: Jul. 16, 2015

(65) Prior Publication Data

US 2016/0028933 A1   Jan. 28, 2016

(30) Foreign Application Priority Data

Jul. 22, 2014   (JP) .................................. 2014-148785

(51) Int. Cl.
   *H04N 5/235*   (2006.01)
   *H04N 5/232*   (2006.01)

(52) U.S. Cl.
   CPC ....... *H04N 5/2357* (2013.01); *H04N 5/23245* (2013.01)

(58) Field of Classification Search
   CPC ............. H04N 5/2357; H04N 5/23245; H04N 5/23293
   USPC .................... 348/226.1, 333.01, 333.13, 241
   See application file for complete search history.

(56) References Cited

U.S. PATENT DOCUMENTS

| | | | | |
|---|---|---|---|---|
| 2006/0197846 A1* | 9/2006 | Nose | ............... | H04N 5/2354 348/226.1 |
| 2009/0141141 A1* | 6/2009 | Onozawa | ............... | G03B 13/36 348/222.1 |
| 2011/0109783 A1* | 5/2011 | Yamazaki | ............... | G03B 5/00 348/333.01 |
| 2011/0181753 A1* | 7/2011 | Sugie | ............... | H04N 5/23296 348/226.1 |
| 2012/0242796 A1* | 9/2012 | Ciurea | ............... | H04N 5/232 348/46 |
| 2013/0342726 A1* | 12/2013 | Ebina | ............... | H04N 5/2357 348/226.1 |
| 2014/0354847 A1* | 12/2014 | Kasai | ............... | H04N 5/2357 348/226.1 |
| 2015/0207975 A1* | 7/2015 | Nguyen | ............... | H04N 5/2357 348/228.1 |

FOREIGN PATENT DOCUMENTS

JP    2003-140220 A    5/2003

* cited by examiner

*Primary Examiner* — Albert Cutler
(74) *Attorney, Agent, or Firm* — Canon U.S.A., Inc. IP Division

(57) ABSTRACT

In one shooting mode in a case where a flicker is detected by a flicker detecting unit, it is determined whether anti-flicker shooting is set, and a flicker icon is lighted and displayed on an in-viewfinder display unit in a different displaying form between when the anti-flicker shooting is set and when it is not set. In another shooting mode, in the case where the flicker is detected by the flicker detecting unit, the flicker icon is hidden.

17 Claims, 7 Drawing Sheets

IMAGING APPARATUS AND CONTROLLING METHOD THEREFORE

BACKGROUND

Field

Aspects of the present invention generally relate to an imaging apparatus including a function to notify a user of a particular situation when it detects the particular situation and to a controlling method therefore.

Description of the Related Art

Conventionally, an imaging apparatus such as a digital camera and a cellular phone terminal with camera, when it detects a situation in which it is not possible to shoot as a user intended or a situation in which intrinsic performance thereof cannot be exerted, may draw user's attention to it by giving a notification to the user. It has been proposed to give warning to the user as necessary, for example, when a camera shake is detected during shooting within or near a viewfinder of the camera (Japanese Patent Application Laid-Open No. 2003-140220).

However, in Japanese Patent Application Laid-Open No. 2003-140220, in a case where a setting of detecting a particular situation such as the camera shake is enabled by user operation in a predetermined shooting mode, the particular situation is detected, and a warning is given. In a case where the setting is always enabled without any user operation in a mode other than the predetermined shooting mode, however, the warning is given when the particular situation is detected, whereby it may give a sense of uneasiness to a user who is not aware of a meaning of the notification.

Furthermore, when the camera is provided with a function to deal with the particular situation when it detects the situation, such as to perform camera shake prevention processing when it detects the camera shake, in a case where a setting whether to detect the particular situation is always enabled without any user operation and where the particular situation is detected and the notification is performed, it is not necessary for the user to deal with the particular situation even when receiving the notification, whereby it may be a meaningless notification.

SUMMARY

Aspects of the present invention are generally related to reducing uneasiness of a user and to preventing useless notifications from being given.

According to an aspect of the present disclosure, an imaging apparatus includes a detecting unit configured to detect a flicker caused by illumination, a processing unit configured to, in a case where the flicker is detected, perform anti-flicker shooting, which is shooting processing at a position where a change rate of a light amount due to the flicker is small, a setting unit configured to set whether to perform the anti-flicker shooting in a predetermined shooting mode from among a plurality of shooting modes; and a control unit configured to control, in the predetermined shooting mode, that detection of the flicker is notified when the flicker is detected and, in a shooting mode that is not the predetermined shooting mode, the detection of the flicker is not notified even when the flicker is detected.

Further features of the present disclosure will become apparent from the following description of exemplary embodiments with reference to the attached drawings.

DESCRIPTION OF THE EMBODIMENTS

Hereinafter, exemplary embodiments of will be described with reference to the attached drawings.

Figure 1A:
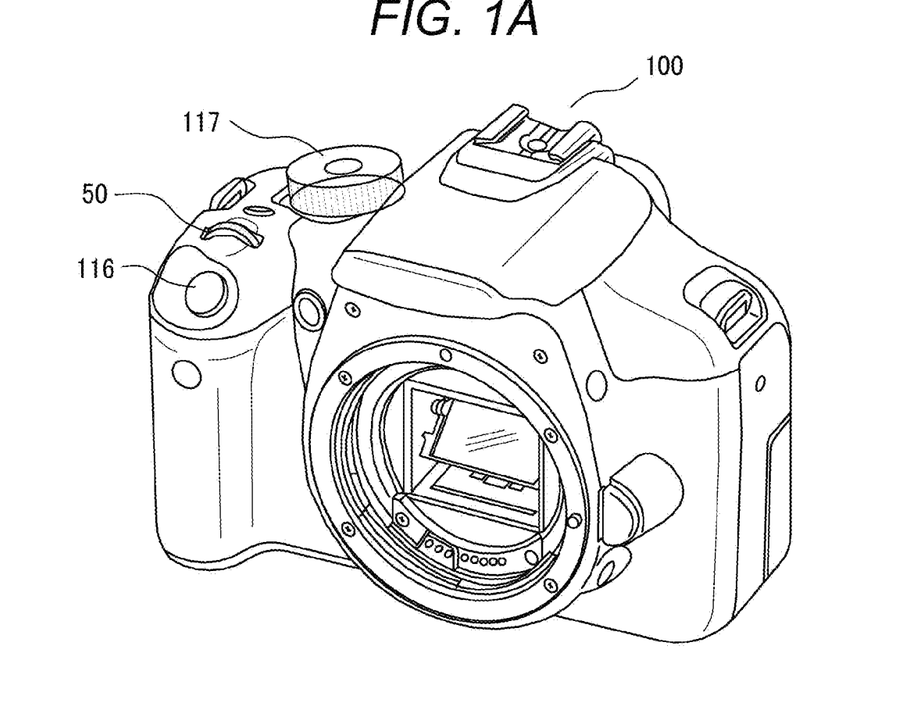
FIGS. 1A and 1B are external appearance views illustrating a digital camera according to an embodiment.
Figure 1B:
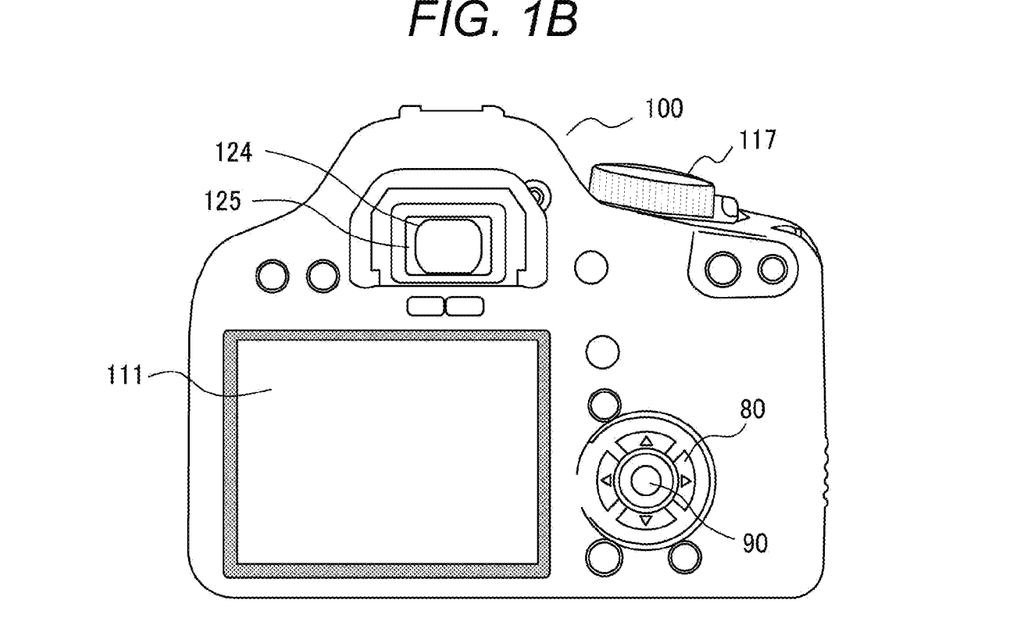

FIGS. 1A and 1B are external appearance views illustrating a digital camera 100 according to an embodiment as an exemplary imaging apparatus. A display unit 111 is a display unit that displays an image and a variety of information. A viewfinder 124 is a viewfinder for observing an object. An in-viewfinder display unit 125 is a display unit that displays a variety of information within the viewfinder 124. A shutter button 116 is an operating unit for giving an image shooting instruction. A mode dial 117 is an operating unit for switching between various modes. A main dial 50, a cursor key 80, and a SET key 90 are operating members that receive operation from a user.

Figure 2:
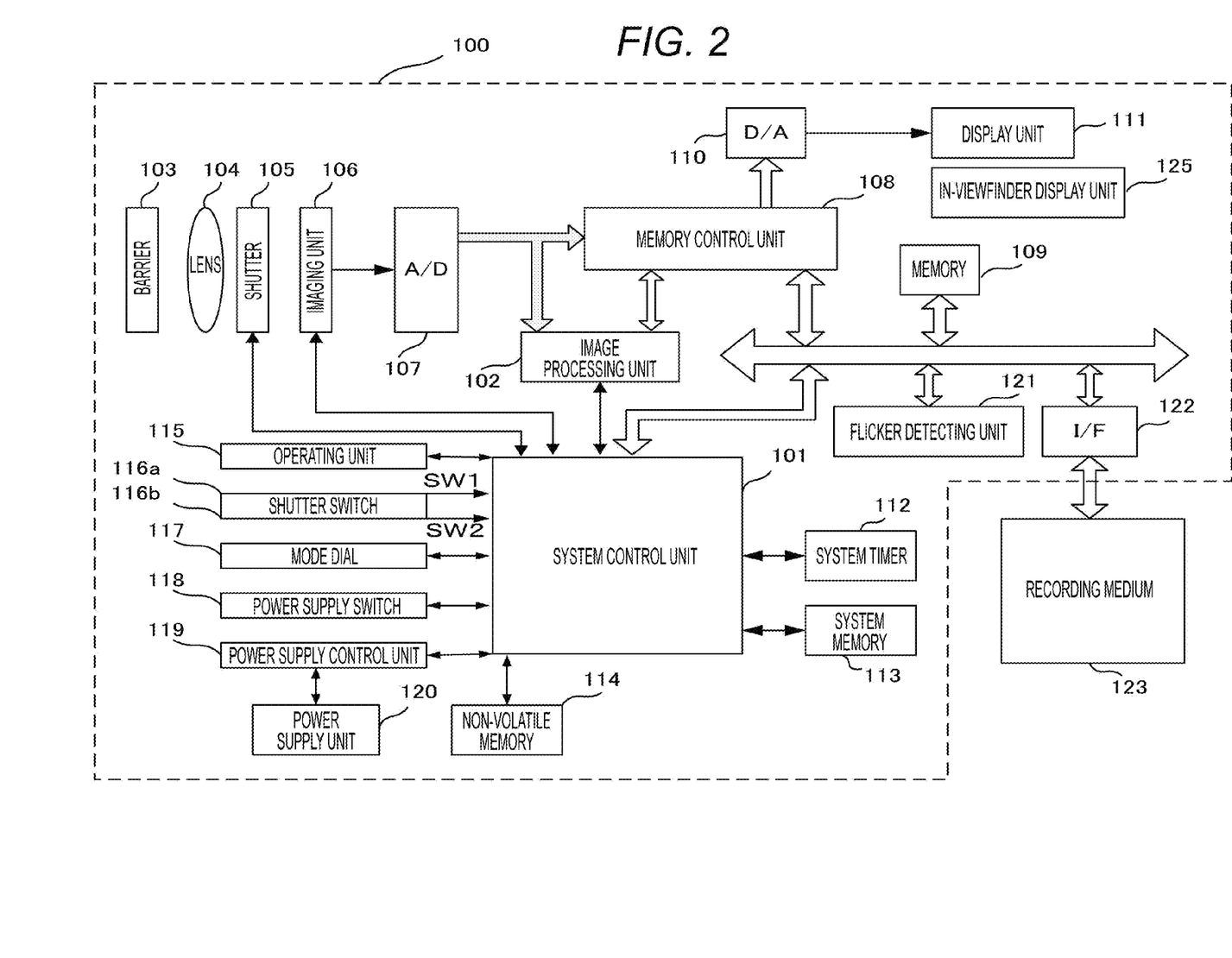
FIG. 2 is a block diagram illustrating an exemplary configuration of the digital camera according to the embodiment.

FIG. 2 is a block diagram illustrating an exemplary configuration of the digital camera 100 according to this embodiment.

A shooting lens 104 is a lens group including a zoom lens and a focus lens. A shutter 105 is a shutter provided with an aperture function. An imaging unit 106 includes an imaging element constituted of a CCD, a CMOS element, and the like that converts an optical image into an electrical signal. An A/D converter 107 converts an analog signal into a digital signal. The A/D converter 107 is used for converting the analog signal output from the imaging unit 106 into the digital signal. By covering an imaging system including the shooting lens 104 of the digital camera 100, a barrier 103 prevents dirt and damage on the imaging system including the shooting lens 104, the shutter 105, and the imaging unit 106.

An image processing unit 102 performs predetermined pixel interpolation, resize processing such as reduction, and color conversion processing on data from the A/D converter 107 and data from a memory control unit 108. The image processing unit 102 also performs predetermined calculation processing using image data that has been shot. Based on a calculation result that has been obtained, a system control unit 101 performs exposure control and ranging control. Accordingly, autofocus (AF) processing, auto exposure (AE) processing, and flash preliminary emission (EF) processing of a through-the-lens (TTL) method are performed. The image processing unit 102 further performs predetermined calculation processing using the image data that has been shot, and based on a calculation result that has been obtained, it also performs auto white balance (AWB) processing of the TTL method.

Output data from the A/D converter 107 is directly written to a memory 109 though the image processing unit 102 and the memory control unit 108 or through the memory control unit 108. The memory 109 stores image data that is obtained by the imaging unit 106 and converted into digital data by the A/D converter 107 as well as image data to be displayed on the display unit 111. The memory 109 is provided with memory capacity sufficient for storing the predetermined number of still images as well as moving images and sounds of the predetermined time. The memory 109 also serves as a memory for image display (video memory). A D/A converter 110 converts data for image display, which is stored in the memory 109, into an analog signal and supplies it to the display unit 111. Accordingly, the image data for display, which has been written in the memory 109, is displayed by the display unit 111 through the D/A converter 110. The display unit 111 performs display on a display device such as a LCD according to the analog signal from the D/A converter 110. By converting the digital signal, which is once A/D converted by the A/D converter 107 and is accumulated in the memory 109, into an analog signal by the D/A converter 110 and by consecutively forwarding it to the display unit 111 and displaying it thereon, the display unit 111 functions as an electronic viewfinder and is capable of performing live view display.

A non-volatile memory 114 is an electrically erasable and recordable memory, and for example, an EEPROM and the like are used as it. In the non-volatile memory 114, a constant, a program and the like for operating the system control unit 101 are stored. The program referred to here is a program for executing a variety of flowcharts described below in this embodiment.

The system control unit 101 controls the entire digital camera 100. By executing the program recorded in the non-volatile memory 114, the system control unit 101 realizes each of processing described below in this embodiment.

As a system memory 113, for example, a RAM is used. In the system memory 113, a constant and a variant for operating the system control unit 101 as well as the program and the like read from the non-volatile memory 114 are expanded. The system control unit 101 also performs display control by controlling the memory 109, the D/A converter 110, the display unit 111, and the like.

A system timer 112 is a clocking unit that measures the time used in a variety of control and the time of a built-in clock.

The mode dial 117, a first shutter switch 116a, and a second shutter switch 116b are operating units for inputting a variety of operation instructions to the system control unit 101. An operating mode of the system control unit 101 is switched to any of a still image shooting mode, a movie shooting mode, and the like by using the mode dial 117. An auto shooting mode, an auto scene determination mode, a manual mode, a variety of scene modes having a different shooting setting for each of captured scenes, a program AE mode, a custom mode, and the like are modes included in the still image shooting mode. It is possible to directly switch to any of these modes included in a still image shooting mode by using the mode dial 117. It is also possible to switch once to the still image shooting mode by using the mode dial 117 and switch to any of these modes included in the still image shooting mode by using another operating member. Similarly, a movie shooting mode may also include a plurality of modes. The first shutter switch 116a is turned on by a so-called half press of the shutter button 116, or during operation thereof (shooting preparation instruction), and a first shutter switch signal SW1 is generated. By the first shutter switch signal SW1, operation such as the AF processing, the AE processing, the AWB processing, and the EF processing are started. The second shutter switch 116b is turned on by a so-called full press of the shutter button 116, or when the operation thereof is completed (image shooting instruction), and a second shutter switch signal SW2 is generated. By the second shutter switch signal SW2, the system control unit 101 starts operation of a series of shooting processing from signal reading from the imaging unit 106 to writing of image data to a recording medium 123. By selecting and operating various function icons displayed on the display unit 111 and the like, a function is allocated for each scene as appropriate to each of the operating members of an operating unit 115, and whereby it functions as a variety of function buttons. As the function buttons, there are, for example, an end button, a return button, an image feeding button, a jump button, a depth-of-field preview button, an attribute change button, and the like. For example, when a menu button is pressed, a variety of settable menu screens are displayed on the display unit 111. The user can make a variety of settings intuitively by using the menu screen displayed on the display unit 111, the cursor keys 80 for up, down, left, and right, and the SET key 90.

A power supply control unit 119 is constituted of a battery detecting circuit, a DC-DC converter, a switch circuit for switching between blocks to be conducted, and the like, and it performs detection of whether or a battery is installed, a battery type, and remaining battery capacity. Based on a detection result thereof and an instruction from the system control unit 101, the power supply control unit 119 also controls the DC-DC converter and supplies required voltage for a required period of time to each of units including the recording medium 123.

A power supply unit 120 is constituted of a primary battery such as an alkaline battery and a lithium battery, a secondary battery such as a Ni—Cd battery, a Ni-MH battery, and a Li battery, an AC adapter, and the like.

A recording medium I/F 122 is an interface with the recording medium 123 such as a memory card and a hard disk. The recording medium 123 is a recording medium such as a memory card and the like for recording an image that has been shot, and it is constituted of a semiconductor memory, a magnetic disk, and the like.

A flicker detecting unit 121 detects occurrence of a flicker from a shutter speed and a period of light amount data.

The digital camera 100 according to this embodiment is capable of performing anti-flicker shooting using a flicker detection function. The flicker is a phenomenon of causing variation in color and brightness of a photograph that has been shot even when a setting of a camera is the same when it is shot at a high shutter speed and when a fluorescent light is used as a light source (illumination).

The flicker detection function will now be described. The system control unit 101 sends the light amount data of a flickering light source to the flicker detecting unit 121. Under control of the system control unit 101, the flicker detecting unit 121 detects occurrence of the flicker from the shutter speed and the period of the light amount data.

The anti-flicker shooting will now be described. The system control unit 101 performs control such that the flicker detecting unit 121 starts operation of flicker detection processing by the first shutter switch signal SW1. The system control unit 101, by the second shutter switch signal SW2, starts operation of shooting processing at a peak position where a change rate of a light amount calculated by the flicker detecting unit 121 is the lowest. By performing flicker detection in this way, it is possible to perform shooting in timing where the flicker does not occur.

Hereinafter, operation of the digital camera 100 according to this embodiment is described with reference to FIGS. 3 to 5.

Figure 3:
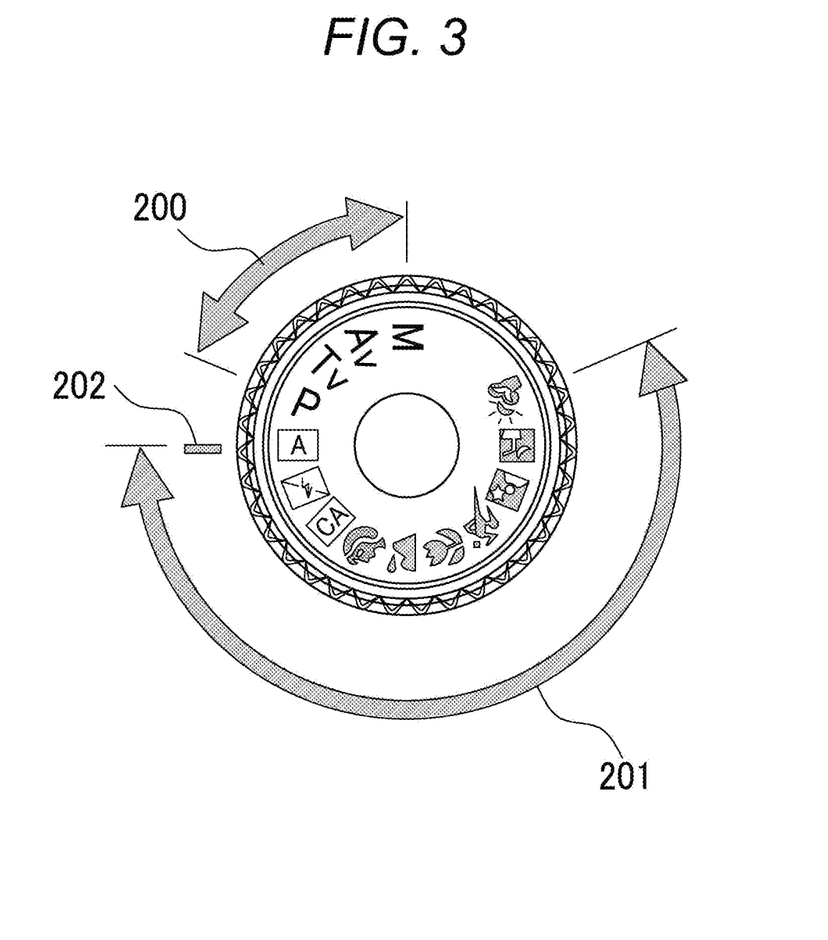
FIG. 3 is a view illustrating a mode dial of the digital camera according to the embodiment.

FIG. 3 is a view illustrating the mode dial 117.

A zone 200 is a Creative Zone and includes a program AE mode "P", a shutter priority AE mode "Tv", an aperture priority AE mode "Av", and a manual exposure mode "M". By turning the mode dial 117 such that any of mode marks marked in the Creative Zone 200 matches with a mode index mark 202, it is set to a shooting mode corresponding to the mode mark.

In the program AE mode "P", by the half press of the shutter button 116, the digital camera 100 automatically determines the shutter speed and an aperture value. The user can perform a program shift by operating the main dial 50. In the shutter priority AE mode "Tv", when the user sets the shutter speed using the main dial 50, the digital camera 100 automatically sets the aperture value according to brightness of an object. In the aperture priority AE mode "Av", when the user sets the aperture value using the main dial 50, the digital camera 100 automatically sets the shutter speed according to the brightness of the object. In the manual exposure mode "M", the user can shoot by determining the shutter speed and the aperture value.

In the shooting modes of the Creative Zone 200, it is possible to set an operating mode whether to perform the anti-flicker shooting.

The anti-flicker shooting is capable of performing shooting in timing where the flicker does not occur by performing control such that the shooting is performed at the peak position where the change rate of the flicker light amount is the lowest as described below. However, a release time lag may occur since the flicker detection is performed. Also, since the shooting is performed in accordance with a wavelength of the flicker, a frame speed during continuous shooting operation may be decreased.

Due to the above, in the shooting modes of the Creative Zone 200, considering a possibility that the user is skilled in camera operation to some extent, the user can set the operating mode of the anti-flicker shooting (selection whether to perform the anti-flicker shooting).

A zone 201 is a Basic Zone and includes a scene intelligent auto mode, a flash emission inhibiting mode, a creative auto mode, a portrait mode, a scenery mode, a close-up mode, a sport mode, a night view portrait mode, a hand-held night view mode, and an HDR backlight correction mode. By turning the mode dial 117 such that any of mode marks marked in the Basic Zone 201 matches with the mode index mark 202, it is set to a shooting mode corresponding to the mode mark.

In these shooting modes in the Basic Zone 201, the digital camera 100 automatically sets an optimum shutter speed, an optimum aperture value, and the like. Therefore, the user can easily perform good shooting just by pressing down the shutter button 116.

Due to the above, in the shooting modes of the Basic Zone 201, considering a possibility that the user is not skilled in the camera operation, the user cannot set the operating mode of the anti-flicker shooting, and the anti-flicker shooting is always enabled.

With regard to the above-described shooting modes and an operating mode setting of the anti-flicker shooting, when the mode dial 117 is set to the Basic Zone 201, considering the possibility that the user is not skilled in the camera operation, the anti-flicker shooting is always enabled. In contrast, when the mode dial 117 is set to the Creative Zone 200, considering the possibility that the user is skilled in camera operation to some extent, the operating mode of the anti-flicker shooting can be set by the user as necessary.

Figure 4:
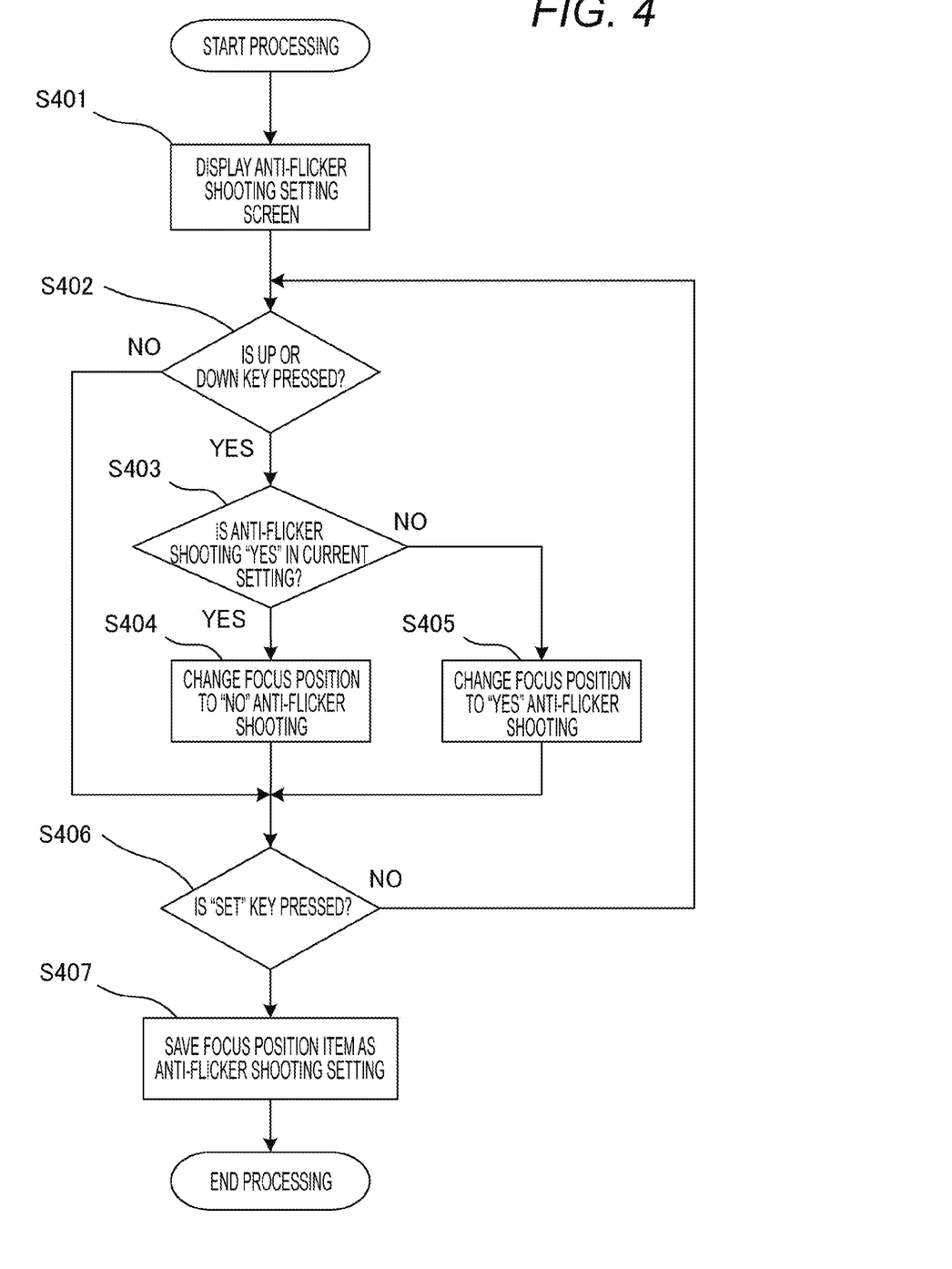
FIG. 4 is a flowchart illustrating a processing flow of operating mode setting of anti-flicker shooting in a Creative Zone according to this embodiment.
Figure 5:
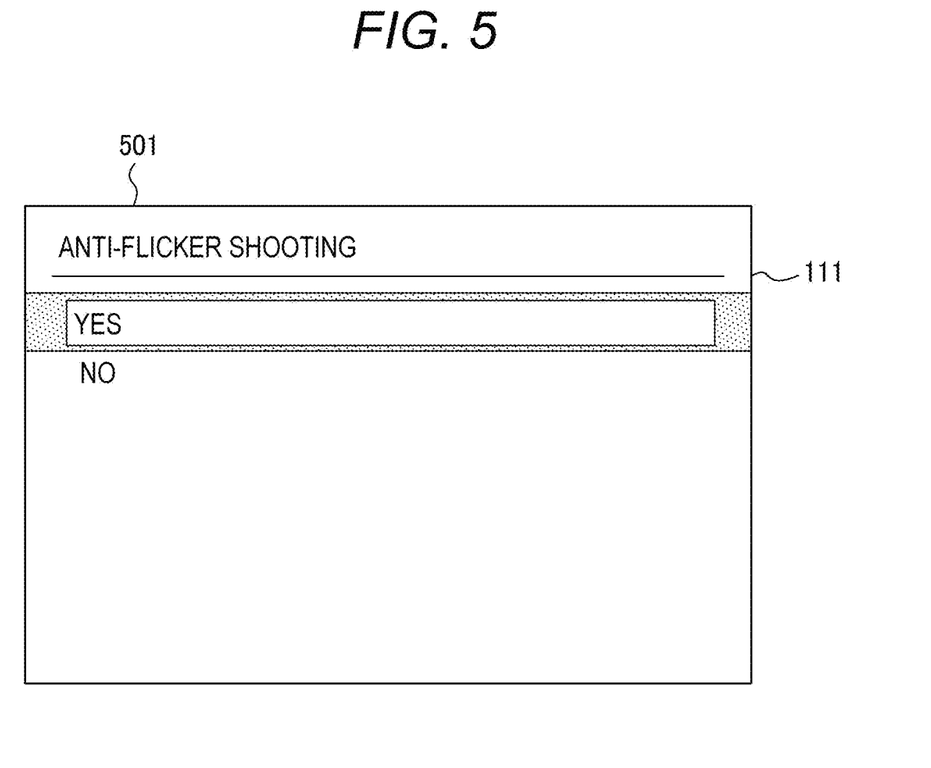
FIG. 5 is a view illustrating an exemplary operating mode setting screen of the anti-flicker shooting.

FIG. 4 is a flowchart illustrating a processing flow of the operating mode setting of the anti-flicker shooting when the shooting mode is the Creative Zone 200.

In step S401, the system control unit 101 displays an operating mode setting screen of the anti-flicker shooting, which is for setting the operating mode of the anti-flicker shooting, on the display unit 111. In FIG. 5, an exemplary operating mode setting screen 501 of the anti-flicker shooting displayed on the display unit 111 is illustrated.

In step S402, the system control unit 101 determines whether the up or the down key of the cursor keys 80 is pressed. In a case where the up or the down key is pressed, the processing is advanced to step S403, and in a case where the up or the down key is not pressed, the processing is advanced to step S406.

In step S403, the system control unit 101 determines whether the anti-flicker shooting is set to "yes" in a current setting. In a case where it is set to "yes", the processing is advanced to step S404, and a focus position of the operating mode setting screen 501 is changed to "no". In a case where it is set to "no", the processing is advanced to step S405, and the focus position of the operating mode setting screen 501 is changed to "yes".

In step S406, the system control unit 101 determines whether the SET key 90 is pressed. In a case where the SET key 90 is pressed, the processing is advanced to step S407, and an item "yes" or "no" of the focus position is saved as the operating mode setting of the anti-flicker shooting. In a case where the SET key 90 is not pressed, it is returned to step S402.

Figure 6:
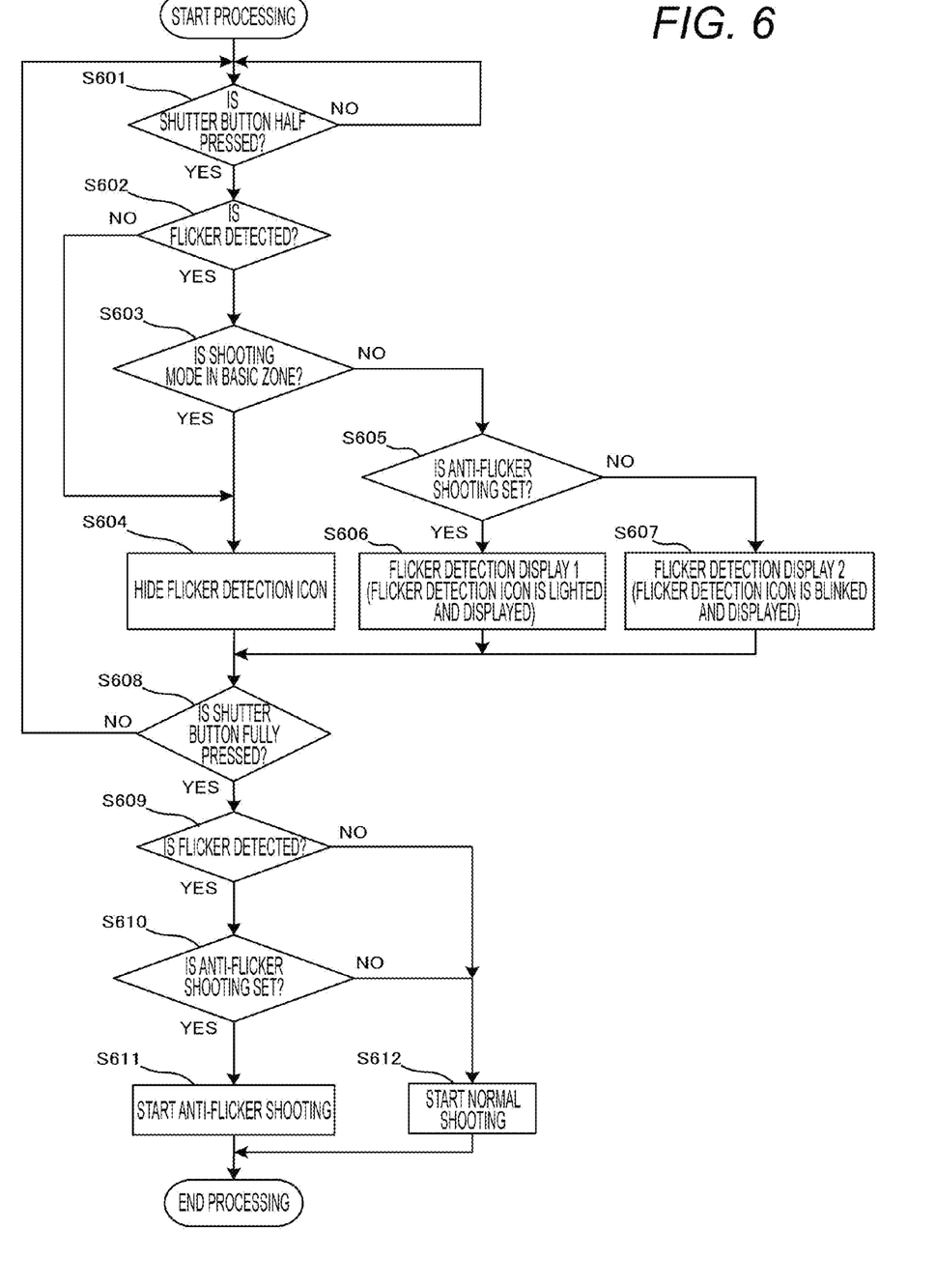
FIG. 6 is a flowchart illustrating a flow of notification processing and shooting when a flicker is detected.
Figure 7:
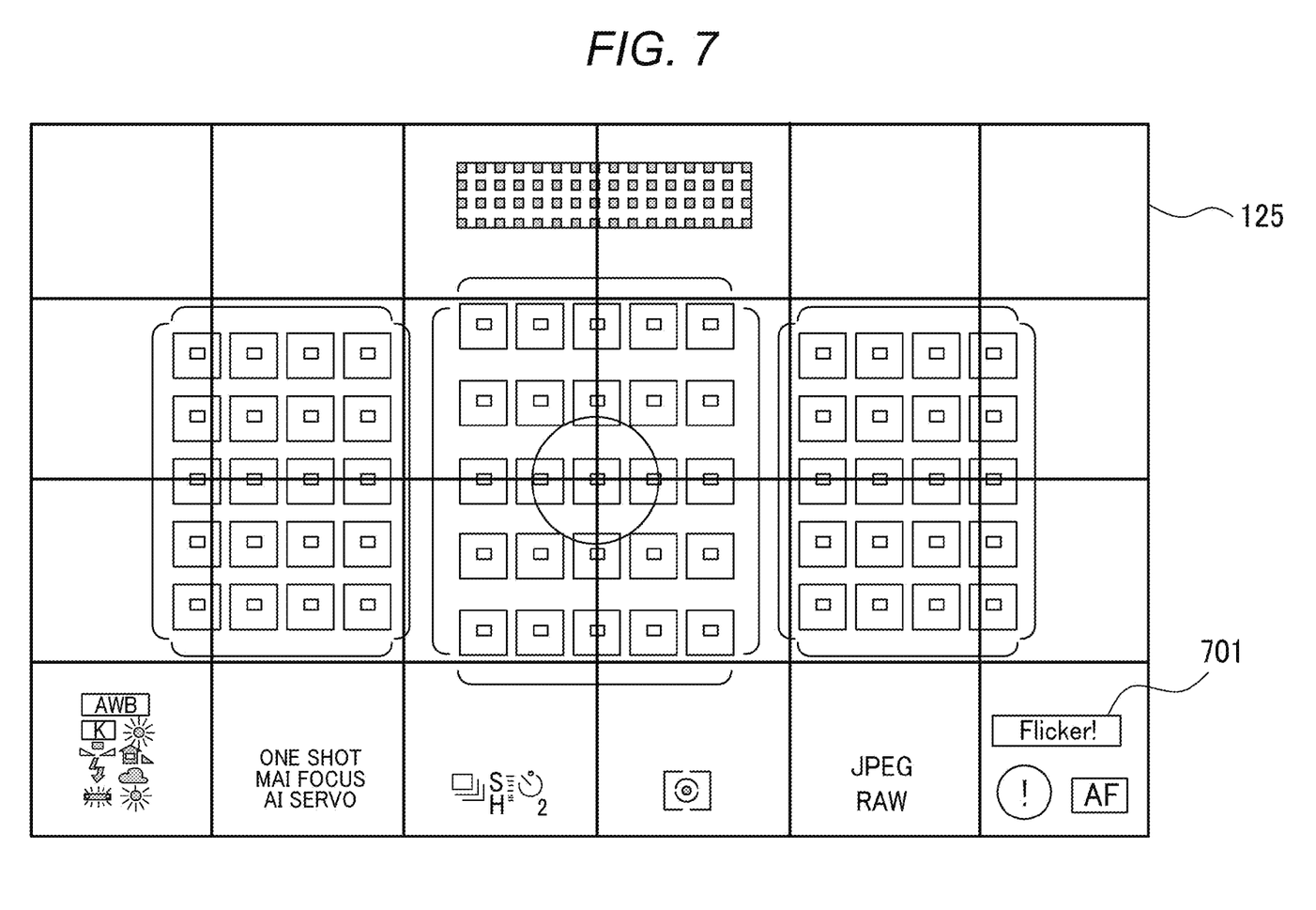
FIG. 7 is a view illustrating exemplary display of an in-viewfinder display unit.

FIG. 6 is a flowchart illustrating a flow of notification processing and shooting when the flicker is detected. In FIG. 7, exemplary display of the in-viewfinder display unit 125 is illustrated. The in-viewfinder display unit 125 is capable of displaying a flicker icon (an icon that notifies of a flicker detection state) 701.

In step S601, the system control unit 101 determines whether the shutter button 116 is half pressed, waits until it is half pressed, and when it is half pressed, advances the processing to step S602.

In step S602, the system control unit 101 determines whether the flicker is detected by the flicker detecting unit 121. In a case where the flicker is detected, it advances the processing to step S603, and in a case where the flicker is not detected, it advances the processing to step S604.

In step S603, the system control unit 101 determines whether the shooting mode is the Basic Zone 201. In a case where it is the Basic Zone 201, it advances the processing to step S604, and in a case where it is not the Basic Zone 201, that is, in a case where it is the Creative Zone 200, it advances the processing to step S605.

In step S605, the system control unit 101 determines whether the anti-flicker shooting is set. In a case where the anti-flicker shooting is set, it advances the processing to step S606, and the flicker icon 701 is lighted and displayed on the in-viewfinder display unit 125. That is, it is in an environment with the flicker and in a situation where the anti-flicker shooting is set. In a case where the anti-flicker shooting is not set, it advances the processing to step S607, and the flicker icon 701 is blinked and displayed thereon. That is, it is in the environment with the flicker and in a situation where the anti-flicker shooting is not set (a situation in which the flicker may occur).

On the other hand, in step S604, the system control unit 101 hides the flicker icon 701. In a case where the shooting mode is the Basic Zone 201, there is a high possibility that the user is not skilled in the camera operation and may not be capable of making the setting of the anti-flicker shooting (anti-flicker shooting is always enabled). Displaying the flicker icon 701 may give a sense of uneasiness to the user who is not aware of a meaning thereof. Moreover, in a case where the flicker icon 701 is displayed when the anti-flicker shooting is always enabled without any user operation, there is no need for the user to deal with it, whereby it may become a meaningless notification.

In step S608, the system control unit 101 determines whether the shutter button 116 is fully pressed. In a case where the shutter button 116 is fully pressed, it advances the processing to step S609, and in a case where the shutter button 116 is not fully pressed, it returns the processing to step S601.

In step S609, the system control unit 101 determines whether the flicker is detected by the flicker detecting unit 121. In a case where the flicker is detected, it advances the processing to step S610, and in a case where the flicker is not detected, it advances the processing to step S612 and starts normal shooting.

In step S610, the system control unit 101 determines whether the anti-flicker shooting is set. In a case where the anti-flicker shooting is set, it advances the processing to step S611 and starts the anti-flicker shooting. In a case where the anti-flicker shooting is not set, it advances the processing to step S612 and starts the normal shooting.

Note that in this embodiment, a flicker detection state is notified by displaying an icon on the in-viewfinder display unit 125; however, a method of notifying of the flicker detection state may also be an icon displayed on the display unit 111 or a sound.

Note that control by the system control unit 101 may be performed by one hardware device or by a plurality of hardware devices sharing the processing for controlling the entire apparatus.

The above-described exemplary embodiments are not seen to be limiting, and various forms are also included in the present disclosure. Furthermore, each of the above-described embodiments can be combined as appropriate.

In the above-described embodiments, an example has been described with reference to a digital camera. This example is not seen to be limiting, and the present disclosure is applicable to any device that provides functionality as an imaging apparatus. That is, the present disclosure is applicable to a cellular phone terminal including camera, a portable type image viewer, and the like.

According to the present disclosure, in a predetermined shooting mode in which it is possible to set whether to perform specific processing when a particular situation is detected based on user operation, detection of the particular situation is notified when the particular situation is detected, and in a mode that is not the predetermined shooting mode, detection of the particular situation is not notified even when the particular situation is detected, whereby it is possible to reduce uneasiness of the user and to prevent making a useless notification.

Other Embodiments

Additional exemplary embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™)), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2014-148785, filed Jul. 22, 2014, which is hereby incorporated by reference herein in its entirety.

What is claimed is:

1. An imaging apparatus comprising:
at least one processor; and
at least one memory having stored thereon instructions that when executed by the at least one processor cause the at least one processor to function as:
  a detecting unit configured to detect a flicker caused by illumination;
  a processing unit configured to, in a case where the flicker is detected, perform anti-flicker shooting processing, which is shooting processing at a position where a change rate of a light amount due to the flicker is small;
  a selection unit configured to select a shooting mode of the imaging apparatus from among a plurality of shooting modes by a user operation;
  a setting unit configured to set whether to perform the anti-flicker shooting processing in a predetermined shooting mode; and
  a control unit configured to control, in the predetermined shooting mode, that detection of the flicker is notified when the flicker is detected and, in a shooting mode that is not the predetermined shooting mode, that the detection of the flicker is not notified even when the flicker is detected.

2. The imaging apparatus according to claim 1, wherein the control unit is configured to, when notifying of the detection of the flicker, provide a different notification depending on whether it is set that the anti-flicker shooting processing is performed by the setting unit.

3. The imaging apparatus according to claim 1, wherein in the shooting mode that is not the predetermined shooting mode, it is set in advance that the anti-flicker shooting processing is performed.

4. The imaging apparatus according to claim 1, wherein the detecting unit is configured to detect the flicker based on a shutter speed and a period of light amount data.

5. The imaging apparatus according to claim 1, wherein in the anti-flicker shooting processing, flicker detection processing by the detecting unit is started in response to a half press of a shutter button.

6. The imaging apparatus according to claim 5, wherein in the anti-flicker shooting processing, operation of the shooting processing is started at a peak position where the change rate of the light amount due to the flicker is the smallest when the shutter button is fully pressed.

7. The imaging apparatus according to claim 1, wherein the predetermined shooting mode includes at least one of a shutter priority mode in which an aperture value is automatically set according to a set shutter speed, an aperture priority mode in which a shutter speed is automatically set according to a set aperture value, and a manual mode in which both a shutter speed and an aperture value are set.

8. The imaging apparatus according to claim 7, wherein a shooting mode other than the predetermined shooting mode includes a mode in which a shutter speed and an aperture value are automatically set.

9. The imaging apparatus according to claim 1, wherein the control unit is configured to control so as to, when notifying of the detection of the flicker, perform display indicating the detection of the flicker on an in-view-finder display unit.

10. An imaging apparatus comprising:
at least one processor; and
at least one memory having stored thereon instructions that when executed by the at least one processor cause the at least one processor to function as:
a detecting unit configured to detect a flicker caused by illumination;
a processing unit configured to, in a case where the flicker is detected, perform anti-flicker shooting processing;
a setting unit configured to set whether to perform the anti-flicker shooting processing in a predetermined shooting mode from among a plurality of shooting modes; and
a control unit configured to control, in the predetermined shooting mode, that detection of the flicker is notified when the flicker is detected and, in a shooting mode that is not the predetermined shooting mode, that the detection of the flicker is not notified and the anti-flicker shooting processing is performed by the processing unit even when the flicker is detected.

11. The imaging apparatus according to claim 10, wherein the anti-flicker shooting is shooting processing at a position where a change rate of a light amount due to the flicker is small.

12. A control method for an imaging apparatus, the method comprising:
detecting a flicker caused by illumination;
performing, in a case where the flicker is detected, anti-flicker shooting processing, which is shooting processing at a position where a change rate of a light amount to the flicker is small;
selecting a shooting mode of the imaging apparatus from among a plurality of shooting modes by a user operation;
setting whether to perform the anti-flicker shooting processing in a predetermined shooting mode; and
controlling, in the predetermined shooting mode, that detection of the flicker is notified when the flicker is detected and, in a shooting mode that is not the predetermined shooting mode, that the detection of the flicker is not notified even when the flicker is detected.

13. A control method for an imaging apparatus, the control method comprising:
detecting a flicker caused by illumination;
performing, in a case where the flicker is detected, anti-flicker shooting processing;
setting whether to perform the anti-flicker shooting processing in a predetermined shooting mode from among a plurality of shooting modes; and
controlling, in the predetermined shooting mode, that detection of the flicker is notified when the flicker is detected and, in a shooting mode that is not the predetermined shooting mode, that the detection of the flicker is not notified even when the flicker is detected as well as the anti-flicker shooting processing is performed.

14. A non-transitory computer-readable storage medium storing computer executable instructions for causing an imaging apparatus to execute a control method, the control method comprising:
detecting a flicker caused by illumination;
performing, in a case where the flicker is detected, anti-flicker shooting processing, which is shooting processing at a position where a change rate of a light amount to the flicker is small;
selecting a shooting mode of the imaging apparatus from among a plurality of shooting modes by a user operation;
setting whether to perform the anti-flicker shooting processing in a predetermined shooting mode; and
controlling, in the predetermined shooting mode, that detection of the flicker is notified when the flicker is detected and, in a shooting mode that is not the predetermined shooting mode, that the detection of the flicker is not notified even when the flicker is detected.

15. A non-transitory computer-readable storage medium storing computer executable instructions for causing an imaging apparatus to execute a control method, the control method comprising:
detecting a flicker caused by illumination;
performing, in a case where the flicker is detected, anti-flicker shooting processing;
setting whether to perform the anti-flicker shooting processing in a predetermined shooting mode from among a plurality of shooting modes; and
controlling, in the predetermined shooting mode, that detection of the flicker is notified when the flicker is detected and, in a shooting mode that is not the predetermined shooting mode, that the detection of the flicker is not notified even when the flicker is detected as well as the anti-flicker shooting processing is performed.

16. An imaging apparatus comprising:
at least one processor; and
at least one memory having stored thereon instructions that when executed by the at least one processor cause the at least one processor to function as:
a detecting unit configured to detect a flicker caused by illumination;
a processing unit configured to, in a case where the flicker is detected, perform anti-flicker shooting processing, which is shooting processing at a position where a change rate of a light amount due to the flicker is small;
a selection unit configured to select a shooting mode of the imaging apparatus from among a plurality of shooting modes by a user operation;

a setting unit configured to set whether to perform the anti-flicker shooting processing in a predetermined shooting mode; and a control unit configured to control, in the predetermined shooting mode, that detection of the flicker is notified when the flicker is detected and, in a shooting mode that is not the predetermined shooting mode, that the detection of the flicker is not notified even if the flicker is occurred.

17. A control method for an imaging apparatus, the method comprising:

detecting a flicker caused by illumination;

performing, in a case where the flicker is detected, anti-flicker shooting processing, which is shooting processing at a position where a change rate of a light amount to the flicker is small;

selecting a shooting mode of the imaging apparatus from among a plurality of shooting modes by a user operation;

setting whether to perform the anti-flicker shooting processing in a predetermined shooting mode; and controlling, in the predetermined shooting mode, that detection of the flicker is notified when the flicker is detected and, in a shooting mode that is not the predetermined shooting mode, that the detection of the flicker is not notified even if the flicker is occurred.

* * * * *